United States Patent [19]
Goto et al.

[11] 3,974,861
[45] Aug. 17, 1976

[54] AIR FLOW DIRECTION CONTROL VALVES

[75] Inventors: Kenji Goto; Yukihide Hashiguchi; Norio Shibata, all of Susono, Japan

[73] Assignee: Toyota Jidosha Kogyo Kabushiki Kaisha, Toyoda, Japan

[22] Filed: Mar. 28, 1975

[21] Appl. No.: 562,967

[30] Foreign Application Priority Data
Sept. 9, 1974  Japan.............................. 49-103582

[52] U.S. Cl............................ 137/627.5; 137/612.1
[51] Int. Cl.²......................................... F16K 11/10
[58] Field of Search.............. 137/627.5, 612.1, 115; 60/290

[56] References Cited
UNITED STATES PATENTS

| | | | |
|---|---|---|---|
| 3,025,881 | 3/1962 | Freeman........................... | 137/627.5 |
| 3,835,646 | 9/1974 | Ranft et al............................ | 60/290 |

*Primary Examiner*—Henry T. Klinksiek
*Attorney, Agent, or Firm*—Stevens, Davis, Miller & Mosher

[57] ABSTRACT

An improved air flow direction control valve particularly adapted for use with an exhaust gas purifying system on an internal combustion engine to control the direction of flow of air to be mixed into exhaust gas for effecting additional combustion of the uncombusted constituents therein. The valve essentially comprises a pair of valve members selectively operable to open one of two main outlets and a diaphragm operated shaft for selectively operating the two valve members upon movement between a first and a second position. The shaft is formed with a pair of shoulders which define a reduced diameter shaft portion therebetween, and the two valve members encircle the reduced diameter shaft portion in an oppositely facing relation. The reduced diameter shaft portion is slidable relative to the two valve members and upon movement of the shaft axially into its first position, one of the shoulders thereof is engageable with the first valve member to open the first main outlet, while the other shoulder is engageable with the second valve member to open the second main outlet upon movement of the shaft into its second position. At least one coil spring is provided for urging either of the valve members not engaged by the corresponding shaft shoulder, into a position to keep the corresponding valve outlet closed. The valve further includes a third valve member which is resiliently supported to close an auxiliary valve outlet. According to one embodiment of the invention, the third valve member is operated independently of the shaft, while according to another embodiment, it is operationally associated with the shaft.

25 Claims, 7 Drawing Figures

AIR FLOW DIRECTION CONTROL VALVES

BACKGROUND OF THE INVENTION

This invention relates to an air flow direction control valve and, more particularly, to a multi-way valve particularly adapted for use with an exhaust gas purifying system on an internal combustion engine to change the direction of flow of air to be mixed into exhaust gas for effecting additional combustion of the uncombusted constituents therein.

It is known that in order to purify exhaust gas from an internal combustion engine on an automobile and reform it into as harmless a gas as possible when it is discharged into the atmosphere, it is effective to introduce air into an exhaust gas purifying system and mix it with the exhaust gas from the engine to effect additional combustion of the exhaust gas and reduce the uncombusted constituents contained therein as much as possible. As is also known, it is necessary to change the direction of flow of the air in a complicated pattern to introduce the air into the purifying system through different portions thereof from time to time during the operation of the engine in order to obtain an optimum effect at any time, for example, when the speed of the automobile is reduced or when the exhaust gas purifying system is overheated. In order to meet this requirement, it has been customary to use a couple of three-way valves either separately or in a combined unit. The device is, however, complicated in construction and requires a considerably large space for installation. The device is expensive and a great deal of time, labor and materials are required to install it in an exhaust gas purifying system. Moreover, a complicated mechanism is required to operate such a complicated device to change the direction of flow of air as required.

SUMMARY OF THE INVENTION

It is an object of this invention to eliminate the above mentioned drawbacks of the device known in the art and provide a novel and improved multi-way air flow direction control valve of simpler and less expensive construction which comprises a single housing and a couple of valve members which are associated with a couple of main valve outlets, respectively, and adapted for actuation easily and selectively through operation of a single operating member to selectively open either of the two main outlets.

The valve of this invention comprises a housing having an air inlet and a first, a second and a third outlet; a first valve member associated with the first outlet to keep it normally closed; a second valve member associated with the second outlet to keep it normally closed; a diaphragm operated shaft movable axially between a first and a second position for selectively operating the first and second valve members to selectively open the first and second outlets in such a fashion that while the first outlet is opened, the second outlet is closed and vice versa. The shaft is formed with a pair of mutually facing shoulders which define a reduced diameter shaft portion therebetween, and the first and second valve members encircle the reduced diameter shaft portion in an oppositely facing relation. The reduced diameter shaft portion is slidable relative to the first and second valve members and upon movement of the shaft into its first position, one of the shoulders thereof is engageable with the first valve member to open the first outlet, while the other shoulder is engageable with the second valve member to open the second outlet upon movement of the shaft into its second position. At least one coil spring is provided for urging either of the first and second valve members not engaged by the corresponding shaft shoulder, into a position to keep the corresponding valve outlet closed. The valve further includes a third valve member resiliently supported to normally keep the third outlet closed or open. The third valve member is operable independently of the shaft or is operationally associated therewith.

DETAILED DESCRIPTION

Figure 1:
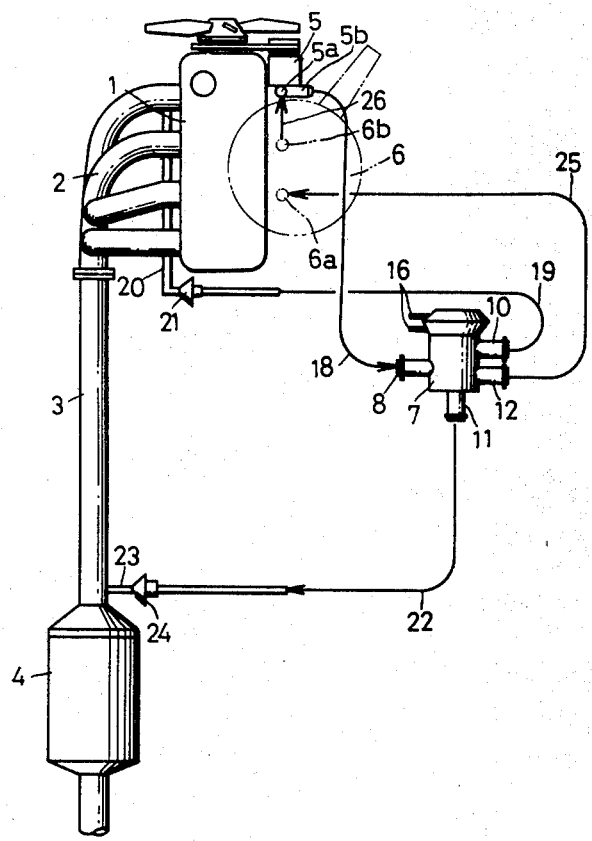
FIG. 1 is a plan view schematically illustrating a valve of this invention installed in an exhaust gas purifying system for an automobile internal combustion engine.

FIG. 1 schematically illustrates a multi-cylinder internal combustion engine 1 having a crank shaft not specifically shown, together principally with its exhaust system in which an air flow direction control valve 7 according to one preferred embodiment of this invention is provided. An air pump 5, which is provided to be driven upon rotation of the crank shaft of the engine 1, has an air inlet 5a and an air outlet 5b. An air cleaner 6 has a main inlet, a return inlet 6a and an outlet 6b. The inlet 5a of the air pump 5 is connected to the outlet 6b of the air cleaner 6 by a conduit 26. The engine 1 is provided with an exhaust manifold 2 having four inlets as shown, each of which is connected with one of the exhaust ports of the engine 1. An air injection manifold 20 is associated with the engine 1 and includes four outlets as illustrated, each of which is connected to one of the exhaust ports of the engine 1 to supply air thereinto through the control valve 7. The outlet of the exhaust manifold 2 in which the exhaust gas fractions discharged from the exhaust ports are collected into a single mass is connected to one end of an exhaust pipe 3. The other end of the exhaust pipe 3 is connected to a catalytic converter 4 which is adapted to purify the exhaust gas by chemical reaction.

The control valve 7 has an inlet port 8 to which the outlet 5b of the air pump 5 is connected by a pipeline 18. The control valve 7 also has a first outlet port 10, a second outlet port 11 and a third outlet port 12. The first outlet port 10 is connected to the air injection manifold 20 by a pipeline 19 and a first check valve 21 is provided between the air injection manifold 20 and the pipeline 19 to prevent any back flow from the air injection manifold 20 to the pipeline 19. The exhaust pipe 3 is provided with an air injection pipe 23 which is open into the exhaust pipe 3 immediately upstream of the catalytic converter 4. The second outlet port 11 of the control valve 7 is connected to the air injection pipe 23 by a pipeline 22 and a second check valve 24 is provided between the pipeline 22 and the air injection pipe 23 to prevent any back flow from the exhaust pipe 3 to the pipeline 22. The third outlet port 12 is connected to the return inlet 6a of the air cleaner 6 by a bypass pipeline 25.

Figure 2:
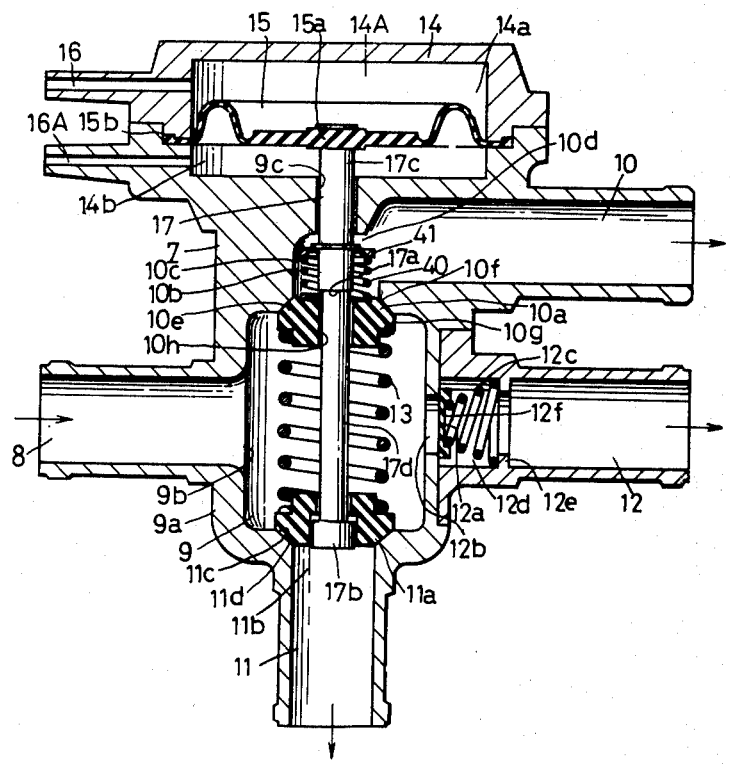
FIG. 2 is a longitudinal sectional view of a preferred form of the valve according to this invention.
Figure 2A:
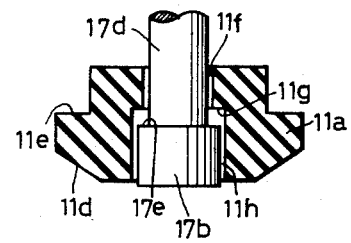
FIG. 2A is a fragmentary enlarged view of the valve shown in FIG. 2.

Referring now to FIG. 2, the control valve 7 comprises a substantially cylindrical housing 9a which is horizontally disposed as illustrated in FIG. 1. The housing 9a defines a cylindrical valve chamber 9 therein and includes four openings 9b, 10b, 11b and 12b around the valve chamber 9. The first opening 9b is provided on one side of the valve chamber 9 and defines the inlet port 8. The second opening 10b is provided at one end of the valve chamber 9 coaxially therewith and at right angles to the first opening 9b. The second opening 10b defines an interconnecting chamber 10c having an outlet 10d formed substantially at right angles to the second opening 10b on the opposite side of the valve chamber 9 from the first opening 9b. The outlet 10d of the interconnecting chamber 10c defines the first outlet port 10 which extends in parallel to the inlet port 8 but in the opposite direction thereto. The third opening 11b is provided at the other end of the valve chamber 9 coaxially therewith and with the second opening 10b, and defines the second outlet port 11 extending at right angles to the inlet port 8 and the first outlet port 10. The fourth opening 12b is provided on the diametrically opposite side of the valve chamber 9 from the first opening 9b and is somewhat smaller in diameter than the first opening 9b. An auxiliary valve chamber 12d, which is coaxial with the fourth opening 12b, is formed on the outside of the valve chamber 9 and has a somewhat larger diameter than the fourth opening 12b. The auxiliary valve chamber 12d interconnects the fourth opening 12b to the third outlet port 12 through an inwardly extending annular flange 12e and the third outlet port 12 extends in parallel to the first outlet port 10 in the same direction therewith. The valve housing 9a is formed with a pair of oppositely disposed annular beveled edges 10e and 11c which are coaxial with each other and are provided adjacent to the second and third openings 10b and 11b, respectively, of the valve chamber 9.

A cylindrical hole 9c is formed through the wall of the valve housing 9a on the opposite side of the valve housing 9a from the second outlet port 11 and is coaxial with the valve chamber 9. An elongate valve member operating shaft 17 is slidably received in the cylindrical hole 9c and one end portion 17c of the shaft 17 extends outwardly from the valve housing 9a. The other end portion 17d of the shaft 17 extends inwardly through the interconnecting chamber 10c into the valve chamber 9 coaxially therewith. The operating shaft 17 is formed with a first annular shoulder 17a therearound. The first shoulder 17a is generally located within the interconnecting chamber 10c and divides the shaft 17 longitudinally into the one end portion 17c and the other end portion 17d which is somewhat smaller in diameter than the one end portion 17c. The shaft 17 is again enlarged in diameter adjacent to the free extremity of the other end portion 17d and a second shoulder 17e is formed to define an increased diameter end 17b at the free extremity of the other end portion 17d. The increased diameter end 17b is generally located in the center of the third opening 11b of the valve housing 9a. A first valve member 10a which is generally annular in configuration is slidably received on the other end portion 17d of the shaft 17 and is positioned within the valve chamber 9 in a location adjacent to the second opening 10b of the valve housing 9a and the first shoulder 17a of the shaft 17. The first valve member 10a includes a beveled edge 10f which is closely complementary to the beveled edge 10e of the valve housing 9a and is adapted to close the second opening 10b and shut off air flow through the first outlet port 10 in the neutral position of the valve 7 as illustrated in FIG. 2. On the opposite side from the beveled edge 10f, the first valve member 10a is considerably reduced in outer diameter to define an inwardly directed shoulder 10g. The first valve member 10a is formed therethrough with an axial hole 10h having a diameter which is slightly larger than the diameter of the other end portion 17d of the shaft 17 to permit axial displacement of the shaft 17 relative to the first valve member 10a. The diameter of the axial hole 10h is, however, smaller than the diameter of the one end portion 17c of the shaft 17 to permit operative engagement of the first shoulder 17a of the shaft 17 against the first valve member 10a.

A second valve member 11a, which is generally similar to the first valve member 10a in construction and is disposed within the valve chamber 9 in a fashion opposite to the first valve member 10a, is slidably received on the free extremity of the other end portion 17d of the shaft 17 coaxially with the first valve member 10a in a location adjacent to the third opening 11b of the valve housing 9a. The second valve member 11a includes a beveled edge 11d formed on one side thereof and facing the beveled edge 11c of the valve housing 9a in a closely complementary fashion. The beveled edge 11d of the second valve member 11a is adapted to close the third opening 11b of the valve housing 9a and shut off air flow through the second outlet port 11 in the neutral position of the valve 7 as illustrated in FIG. 2. On the opposite side from the beveled edge 11d, the second valve member 11a is considerably reduced in outer diameter to define an inwardly directed shoulder 11e. The second valve member 11a has an axial hole 11f and an inner annular shoulder 11g formed intermediate the opposite open ends of the axial hole 11f. The inner shoulder 11g defines an enlarged diameter portion 11h of the axial hole 11f, in which the increased diameter end 17b of the shaft 17 is axially slidably accommodated and is capable of operative engagement with the inner shoulder 11g of the second valve member 11a. It will be seen that the first and second valve members 10a and 11a are adapted for movement in opposite directions to open or close the first and second outlet ports 10 and 11, respectively.

A coil spring 13 is interposed between the first and second valve members 10a and 11a and encircles the other end portion 17d of the shaft 17. The coil spring 13 is engaged at one end with the shoulder 10g of the first valve member 10a, while the other end of the spring 13 is engaged with the shoulder 11e of the second valve member 11a. By the action of the spring 13, the first and second valve members 10a and 11a are normally urged away from each other and their respective beveled edges 10f and 11d closely contact the beveled edges 10e and 11c, respectively, of the valve housing 9a to close the second and third openings 10b and 11b, respectively and shut off air flow through both of the first and second outlet ports 10 and 11. An annular plate 41 encircles and is secured to the one end portion 17c of the shaft 17 and is located within the interconnecting chamber 10c. A second coil spring 40 is interposed between the first valve member 10a and the annular plate 41 and encircles the one end portion 17c of the shaft 17 adjacent to the first shoulder 17a. The second coil spring 40 has a considerably smaller spring force than the first coil spring 13, but provides an auxiliary force to disengage the first valve member 10a from the beveled edge 10e of the valve housing 9a to establish air flow through the first outlet port 10 when the shaft 17 is displaced inwardly as will hereinafter be described in further detail. The component which provides a primary force for operating the shaft 17 will also be described later.

A third valve member 12a, which is substantially of the disc-shaped construction and is somewhat larger in diameter than the fourth opening 12b of the valve housing 9a, is provided in the interconnecting chamber 12d communicating with the third outlet port 12 and is positioned immediately outside of the fourth opening 12b coaxially therewith. The third valve member 12a is formed with a coaxial circular recess 12f on the opposite side thereof from the fourth opening 12b. A third coil spring 12c is interposed between the circular recess 12f and the annular flange 12e coaxially with the third valve member 12a to normally urge the third valve member 12a closely against the fourth opening 12b to close it. The third outlet port 12 is a relief outlet and when the pressure of the air in the valve chamber 9 normally closed at the second and third openings 10b and 11b thereof has reached a predetermined upper limit, the air in the valve chamber 9 forces the third valve member 12a to move away from the fourth opening 12b against the action of the third coil spring 12c, whereby any additional air flow through the inlet port 8 is bypassed through the third outlet port 12 to prevent any further hazardous pressure elevation in the valve chamber 9.

Another housing 14 that is substantially cylindrical in construction is secured to the wall of the valve housing 9a adjacent to the one end portion 17c of the shaft 17 and defines therein a diaphragm chamber 14A which is cylindrical and coaxial with the valve chamber 9. A diaphragm 15 is provided in the diaphragm chamber 14A coaxially therewith and divides the diaphragm chamber 14A into two coaxial sections, i.e., a first section 14a and a second section 14b which is closer to the valve chamber 9 than the first section 14a. The diaphragm 15 is secured at its center 15a to the free extremity of the one end portion 17c of the shaft 17 which extends into the diaphragm chamber 14A through the adjacent wall of the valve housing 9a. The diaphragm 15 has a peripheral edge 15b locked between the adjoining wall edges of the valve housing 9a and the diaphragm housing 14. An elongate first sensing port 16 is formed in the wall of the diaphragm housing 14 at right angles to the axis of the diaphragm chamber 14A and is open at one end into the first section 14a of the diaphragm chamber 14A. An elongate second sensing port 16A is formed in the wall of the valve housing 9a adjacent to the diaphragm housing 14. The second sensing port 16A extends in parallel to the first sensing port 16 and is open at one end into the second section 14b of the diaphragm chamber 14A. The other ends of the first and second sensing ports 16 and 16A are connected to an appropriate source of air pressure not shown, whereby the pressure of the air in the first and second sections 14a and 14b of the diaphragm chamber 14A is selectively varied between the atmospheric pressure and an appropriate degree of reduced pressure to thereby allow the diaphragm 15 to move back and forth along the axis of the diaphragm chamber 14A. In FIG. 2, the diaphragm 15 is shown in its neutral position and maintains the shaft 17 in its neutral position in which both the first and second shoulders 17a and 17e of the shaft 17 are kept free from the first and second valve members 10a and 11a, respectively, so that the first and second valve members 10a and 11a keep the second and third openings 10b and 11b, respectively, of the valve housing 9a closed by the free action of the first coil spring 13.

In operation, the air pump 5 is driven to deliver air from its outlet 5b into the valve 7 through the pipeline 18 and the inlet port 8. The pressure of the air in the valve chamber 9 gradually increases and eventually reaches the predetermined upper limit. The air in the valve chamber 9 forces the third valve member 12a to move away from the fourth opening 12b by overcoming the action of the third coil spring 12c. The air delivered into the valve chamber 9 flows through the fourth opening 12b into the third outlet port 12 and returns into the air cleaner 6 through the pipeline 25. All the air delivered into the valve chamber 9 is bypassed through the third outlet port 12 and no air flows through the first or second outlet port 10 or 11. This situation ceases to exist when it is desired to supply air from the valve chamber 9 either into the air injection manifold 20 through the first outlet port 10 or into the air injection pipe 23 through the second outlet port 11.

In order to distribute air into the air injection manifold 20 through the first outlet port 10, the pressure of the air in the second diaphragm chamber section 14b is reduced, while the first diaphragm chamber section 14a is maintained at the atmospheric pressure. The diaphragm 15 moves toward the second diaphragm chamber section 14b to move the shaft 17 deeper into the valve chamber 9. The annular plate 41 on the shaft 17 contracts the second coil spring 40 because of its smaller spring force than the first coil spring 13 and the shaft 17 is displaced independently of the first valve member 10a and also of the second valve member 11a. In an instant, however, the first shoulder 17a of the shaft 17 abuts against the first valve member 10a. As the pressure of the air in the second diaphragm chamber section 14b is further reduced relative to the first section 14a, the first shoulder 17a of the shaft 17 pushes the first valve member 10a away from the adjacent beveled edge 10e of the valve housing 9a by overcoming the action of the first coil spring 13. It will be observed that the second coil spring 40 assists the diaphragm 15 in urging the first valve member 10a into the position described. The second valve member 11a maintains the third opening 11b closed by the action of the first coil spring 13 as the free extremity of the other end portion 17d of the shaft 17 is displaced relative to the second valve member 11a. Air flow is established between the inlet port 8 and the first outlet port 10 through the valve chamber 9 and its second opening 10b, while no air flows through the second outlet port 11.

In order to distribute air into the exhaust pipe 3 through the air injection pipe 23, the operation as hereinabove described is reversed. The pressure of the air in the first diaphragm chamber section 14a is reduced relative to the second section 14b through the associated sensing ports 16 and 16A connected to an appropriate source of pressure control. The diaphragm 15 moves toward the first diaphragm chamber section 14a to move the shaft 17 outwardly relative to the valve chamber 9. The first shoulder 17a of the shaft 17 is disengaged from the first valve member 10a and the first coil spring 13 brings the first valve member 10a back into engagement with the second opening 10b of the valve housing 9a, whereupon the air flow through the first outlet port 10 is interrupted. The second shoulder 17e of the shaft 17 abuts against the inner shoulder 11g of the second valve member 11a. The shaft 17 moves the second valve member 11a away from the third opening 11b of the valve housing 9a by overcoming the action of the first coil spring 13, whereby air flow is established between the inlet port 8 and the second outlet port 11.

It will be noted that the bypassed air flow through the third outlet port 12 may coexist with the air flow through the first or second outlet port 10 or 11 as long as the pressure of the air in the valve chamber 9 is higher than its predetermined upper limit, and any excess air is bypassed through the third outlet port 12.

Figure 3:
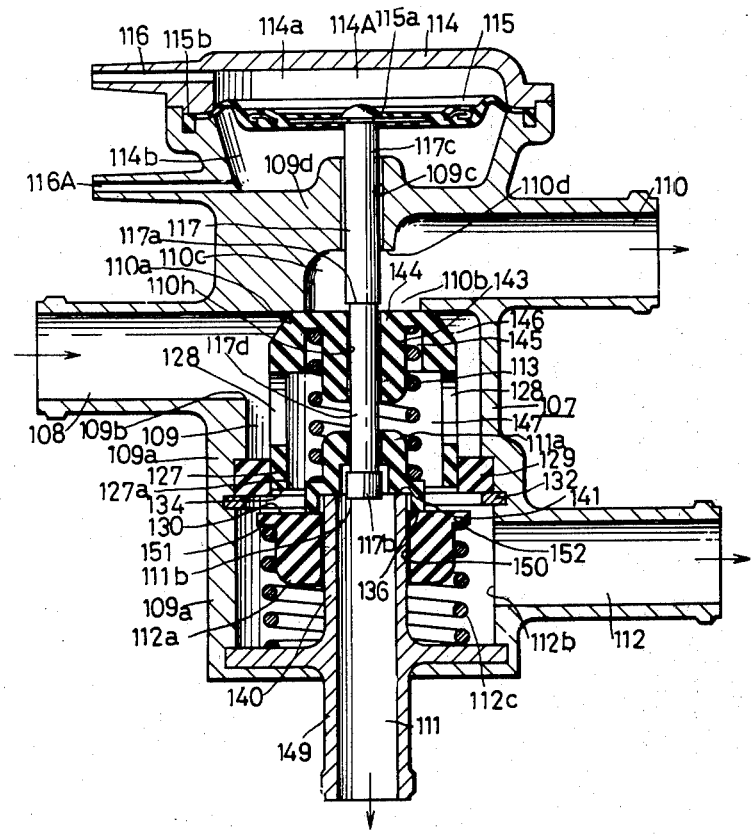
FIG. 3 is a longitudinal sectional view of another form of the valve according to this invention.
Figure 3A:
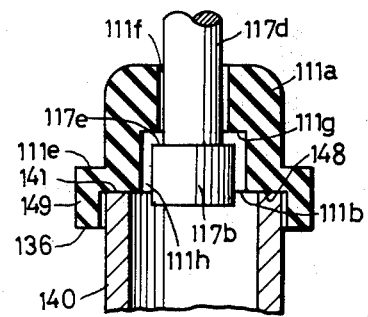
FIG. 3A is a fragmentary enlarged view of the valve shown in FIG. 3.

Attention is now directed to FIG. 3 illustrating an air flow direction control valve 107 according to another embodiment of this invention. The valve 107 comprises a substantially cylindrical housing 109a which defines a substantially cylindrical valve chamber 109 therein. The valve housing 109a has four openings 109b, 110b, 111b and 112b. The first opening 109b defines an inlet port 108 communicating with an air pump which is not shown, but is equivalent to that shown in FIG. 1. The second opening 110b defines a first outlet port 110 extending in parallel to the inlet port 108 in the opposite direction thereto and communicating with an air injection manifold not shown but equivalent to what is shown at 20 in FIG. 1. The third opening 111b defines a second outlet port 111 extending at right angles to the inlet port 108 and the first outlet port 110 and communicating with an air injection pipe not shown but equivalent to what is shown at 23 in FIG. 1. The second outlet port 111 comprises an inwardly extending tubular wall 140 and an outwardly extending tubular wall 142 which is integral and coaxial with the inwardly extending tubular wall 140 and is substantially equal in length thereto. The inwardly extending tubular wall 140 has an inner end 141 positioned approximately in the middle of the valve chamber 109 and defining thereat the third opening 111b of the valve housing 109a. The third opening 111b is coaxial with the second opening 110b. The fourth opening 112b defines a third or relief outlet port 112 extending in parallel to the first outlet port 110 in the same direction therewith and at right angles to the second outlet port 111. The third outlet port 112 communicates with an air cleaner which is not shown, but is equivalent to what is shown at 6 in FIG. 1. The inlet port 108 is located adjacent to one end of the valve chamber 109 on one side thereof and the third outlet port 112 is positioned adjacent to the other end of the valve chamber 109 on the opposite side thereof from the inlet port 108. The valve housing 109a is formed at the one end thereof with a transversely extending wall portion 109d hanging over the second opening 110b to define therebetween an interconnecting chamber 110c having an inlet defined by the second opening 110b. The interconnecting chamber 110c has an outlet 110d which is positioned nearly at right angles to the second opening 110b to direct the first outlet port 110 along an axis which is perpendicular to the axis of the valve chamber 109.

The transversely extending wall portion 109d of the valve housing 109a is formed therethrough with a cylindrical hole 109c which is coaxial with the second opening 110b. An elongate valve member operating shaft 117 is slidably received in the cylindrical hole 109c and extends into the valve chamber 109 through the interconnecting chamber 110c. A first shoulder 117a is formed on the shaft 117 approximately midway between the opposite ends thereof. The first shoulder 117a is located in the second opening 110b of the valve chamber 109 in the neutral position of the valve 107 as illustrated in FIG. 3. The first shoulder 117a divides the shaft 117 into one end portion 117c received in the cylindrical hole 109c and the other end portion 117d positioned within the valve chamber 109 coaxially with the second and third openings 110b and 111b. The one end portion 117c of the shaft 117 extends outwardly from the cylindrical hole 109c. The shaft 117 is formed with a second shoulder 117e adjacent to the free extremity of the other end portion 117d. The second shoulder 117e defines an enlarged diameter end 117b of the other end portion 117d. The enlarged diameter end 117b terminates in the third opening 111b of the valve chamber 109 and is substantially flush with the inner end 141 of the second outlet port 111 in the neutral position of the valve 107 as shown in FIG. 3.

A first valve member 110a, which is substantially cylindrical in construction, encircles the other end portion 117d of the shaft 117 adjacent to the first shoulder 117a. The first valve member 110a is formed therethrough with an axial bore 110h which is coaxial with the second opening 110b of the valve chamber 109. The axial bore 110h is slightly larger in diameter than the other end portion 117d of the shaft 117 and the other end portion 117d is slidably received in the axial bore 110h. The axial bore 110h is, however, smaller in diameter than the one end portion 117c of the shaft 117. The first valve member 110a comprises an inner cylindrical wall 143 defined around the axial bore 110h and an outer cylindrical wall 127 encircling the inner cylindrical wall 143. One end of the inner cylindrical wall 143 is integrally joined to one end of the outer cylindrical wall 127 by an end wall 144. An annular groove 145 is defined between the inner and outer cylindrical walls 143 and 127. The one end of the outer cylindrical wall 127 is formed with an annular beveled edge 146 encircling the end wall 144. The outer cylindrical wall 127 is approximately twice as long as the inner cylindrical wall 143 and defines a cylindrical inner valve chamber 147 therein. The outer cylindrical wall 127 is formed with a plurality of holes 128 therethrough. The other end 134 of the outer cylindrical wall 127 is open and when the first valve member 110a is in its neutral position as illustrated in FIG. 3, the end wall 144 is maintained in contact with the peripheral edge of the second opening 110b to keep it closed.

A second valve member 111a, which is substantially cylindrical in construction, encircles the other end portion 117d of the shaft 117 adjacent to the enlarged diameter portion 117b. The second valve member 111a is formed therethrough with an axial bore 111f which is coaxial with the third opening 111b of the valve chamber 109. The axial bore 111f is somewhat enlarged in diameter intermediate the ends thereof to define a first inner shoulder 111g facing the third opening 111b and defining an enlarged axial bore portion 111h aligned with the second outlet port 111. The enlarged axial bore portion 111h is further increased in diameter adjacent to the third opening 111b to define a second inner shoulder 148 extending in parallel to the first inner shoulder 111g. The second inner shoulder 148 defines an outer shoulder 111e having a larger outer diameter than the second inner shoulder 148 and located in a plane parallel to the plane of the second inner shoulder 148. The second inner shoulder 148 and the outer shoulder 111e define a coaxial cylindrical end wall 149 having a free extremity 136. When the valve 107 is in its neutral position as illustrated in FIG. 3, the second inner shoulder 148 of the second valve member 111a rests on the inner end 141 of the inwardly extending tubular wall 140 of the second outlet port 111 and the end wall 149 encircles the inwardly extending tubular wall 140 adjacent to the inner end 141 thereof. The end wall 149 of the second valve member 111a has an inner diameter which is somewhat larger than the outer diameter of the inwardly extending tubular wall 140. The enlarged diameter end 117b of the shaft 117 is positioned within the enlarged axial bore portion 111h of the second valve member 111a in the neutral position of the valve 107. The second shoulder 117e of the shaft 117 is engageable with the first inner shoulder 111g of the second valve member 111a when the shaft 117 is axially displaced in one direction as will hereinafter be described.

A first coil spring 113 is interposed between the first and second valve members 110a and 111a to urge them in the opposite directions to keep closed the first and second outlet ports 110 and 111, respectively. The second valve member 111a is substantially equal to the inner cylindrical wall 143 of the first valve member 110a in outer diameter and the first coil spring 113 encircles the inner cylindrical wall 143 of the first valve member 110a and the second valve member 111a. One end of the first coil spring 113 is received in the annular groove 145 of the first valve member 110a and the other end of the spring 113 is engaged with the outer shoulder 111e of the second valve member 111a. By the action of the first coil spring 113, the end wall 144 of the first valve member 110a keeps the second opening 110b closed and the second inner shoulder 148 keeps the third opening 111b closed, when the shaft 117 is in its neutral position as illustrated in FIG. 3.

An annular seal 129 encircles the outer cylindrical wall 127 of the first valve member 110a adjacent to the other end 134 thereof in an air-tight manner and the outer cylindrical wall 127 is slidable through the annular seal 129. The outer periphery of the annular seal 129 is secured to the inner wall of the valve housing 109a. A support ring 132 is secured to the inner wall of the valve housing 109a to cooperate therewith to support the annular seal 129 in position. The support ring 132 is larger in inner diameter than the annular seal 129 and is located on the opposite side of the annular seal 129 from the second opening 110b. The end wall 149 of the second valve member 111a has an outer diameter which is smaller than the inner diameter of the outer cylindrical wall 127 of the first valve member 110a and an annular clearance 127a is maintained therebetween.

A substantially cylindrical third valve member 112a encircles the inwardly extending tubular wall 140 of the second outlet port 111. The third valve member 112a has an axial bore 150 having a diameter which is slightly larger than the outer diameter of the inwardly extending tubular wall 140, and is slidable along the wall 140. The third valve member 112a is formed around its outer periphery with an outwardly directed shoulder 151 at one end thereof. The shoulder 151 defines an annular end 152 having a flat end surface 130 which faces the annular clearance 127a between the first and second valve members 110a and 111a. The annular end 152 has an outer diameter which is larger than the inner diameter of the annular seal 129 but smaller than the inner diameter of the support ring 132.

A second coil spring 112c encircles the third valve member 112a and the inwardly extending tubular wall 140 of the second outlet port 111. One end of the second coil spring 112c is engaged with the shoulder 151 of the third valve member 112a and the other end of the spring 112c is engaged with the inner end wall of the valve housing 109a. The flat end surface 130 of the third valve member 112a is engageable with the annular seal 129 and the free extremity 136 of the second valve member 111a. The second coil spring 112c is designed with a smaller spring force than the first coil spring 113. When the shaft 117 is in its neutral position as illustrated in FIG. 3, the free extremity 136 of the second valve member 111a is maintained in contact with the end surface 130 of the third valve member 112a, with the second inner shoulder 148 of the second valve member 111a resting against the inner end 141 of the second outlet port 111, by the action of the first coil spring 113. Accordingly, the end surface 130 of the third valve member 112a is urged in a position spaced apart from the annular seal 129 against the action of the second coil spring 112c. Thus, when the valve 107 is in its neutral position, the flow of air is maintained between the inlet port 108 and the third outlet port 112 through the holes 128 of the first valve member 110a, the clearance 127a around the second valve member 111a, the clearance between the annular seal 129 and the third valve member 112a and the space encircling the third valve member 112a. All of the air delivered into the valve chamber 109 is recirculated into the air cleaner without flowing out into either the first or second outlet port 110 or 111.

A substantially cylindrical diaphragm housing 114 is secured to the transversely extending wall portion 109d of the valve housing 109a, and defines therein a diaphragm chamber 114A which is substantially cylindrical and coaxial with the valve chamber 109. A circular diaphragm 115 is provided in the diaphragm chamber 114A coaxially therewith and divides the diaphragm chamber 114A into two coaxial sections, i.e., a first section 114a and a second section 114b which is closer to the valve chamber 109 than the first section 114a. The diaphragm 115 is secured at its center 115a to the free extremity of the one end portion 117c of the shaft 117 which extends into the diaphragm chamber 114A through the cylindrical hole 109c of the valve housing wall portion 109d. The diaphragm 115 has a peripheral edge 115b locked between the adjoining wall edges of the valve housing 109a and the diaphragm housing 114. An elongate first sensing port 116 is formed in the wall of the diaphragm housing 114 at right angles to the axis of the diaphragm chamber 114A and is open at one end into the first diaphragm chamber section 114a. A similar elongate second sensing port 116A is formed in the transversely extending wall portion 109d of the valve housing 109a and extends in parallel to the first sensing port 116. The second sensing port 116A is open at one end into the second diaphragm chamber section 114b. The other ends of the first and second sensing ports 116 and 116A are connected to an appropriate source of air pressure control not shown, whereby the pressure of the air in the first and second sections 114a and 114b of the diaphragm chamber 114A is selectively varied relative to each other between the atmospheric pressure and an appropriate degree of reduced pressure to thereby allow back and forth axial movement of the shaft 117 through the valve chamber 109. In FIG. 3, the diaphragm 115 is shown in its neutral position and maintains the shaft 117 in its neutral position in which the first and second valve members 110a and 111a keep closed the first and second outlet ports 110 and 111, respectively, by the action of the first coil spring 113.

In operation, the pressure of the air in the second diaphragm chamber section 114b is reduced relative to the first section 114a in order to distribute air through the first outlet port 110. The diaphragm 115 causes axial movement of the shaft 117 deeper into the valve chamber 109. The first shoulder 117a of the shaft 117 abuts against the end wall 144 of the first valve member 110a and disengages the first valve member 110a from the peripheral edge of the second opening 110b of the valve chamber 109 against the action of the first coil spring 113. The free end 134 of the first valve member 110a is brought into contact with the end surface 130 of the third valve member 112a, whereby the flow of air from the inlet port 108 to the third outlet port 112 is interrupted. It will be noted that the free end portion of the first valve member 110a defined between the holes 128 and the free end 134 is long enough to ensure complete closure of the clearance between the annular seal 129 and the end surface 130 of the third valve member 112a when the first valve member 110a is brought into contact with the third valve member 112a. As the second coil spring 112c urges the end surface 130 of the third valve member 112a against the free end 134 of the first valve member 110a, the closure of the clearance therebetween is further ensured to permit introduction of air into the valve chamber 109 at a considerably increased rate without causing any flow through the third outlet port 112 unless the pressure of the air in the valve chamber 109 exceeds a predetermined upper limit.

In order to distribute air through the second outlet port 111, the operation as hereinabove described is reversed. The reversal in pressure difference of the control air in the first and second diaphragm chamber sections 114a and 114b causes the diaphragm 115 to move the shaft 117 in the opposite direction. The second shoulder 117e of the shaft 117 abuts against the first inner shoulder 111g of the second valve member 111a. The second valve member 111a is drawn into the first valve member 110a against the action of the first coil spring 113 and the free end 136 and second inner shoulder 148 of the second valve member 111a are disengaged from the end surface 130 of the third valve member 112a and the inner end 141 of the second outlet port 111, respectively. The third valve member 112a is moved toward the first valve member 110a by the action of the second coil spring 112c, but its further movement is stopped upon abutment of its end surface 130 against the annular seal 129. The free end 136 of the second valve member 111a is, however, still spaced apart from the end surface 130 of the third valve member 112a to define a clearance required to establish air flow through the second outlet port 111. It will be observed in this connection that the distance between the inner cylindrical wall 143 of the first valve member 110a and the second valve member 111a in the neutral position of the shaft 117 must be large enough to permit complete withdrawal of the second valve member 111a into the first valve member 110a to provide the clearance between the second and third valve members 111a and 112a upon operation of the shaft 117 in the direction to open the second outlet port 111. It will also be understood that the engagement between the annular seal 129 and the end surface 130 of the third valve member 112a interrupts communication between the inlet port 108 and the third outlet port 112.

In a way similar to what has hereinbefore been described in connection with the embodiment of FIG. 2, it will be noted that the bypass flow of air through the third outlet port 112 may coexist with the air flow through either the first or second outlet port 110 or 111 in the event the pressure of the air delivered into the valve chamber 109 is high enough to overcome the action of the second coil spring 112c, whereby any excess air is bypassed through the third outlet port 112.

Figure 4:
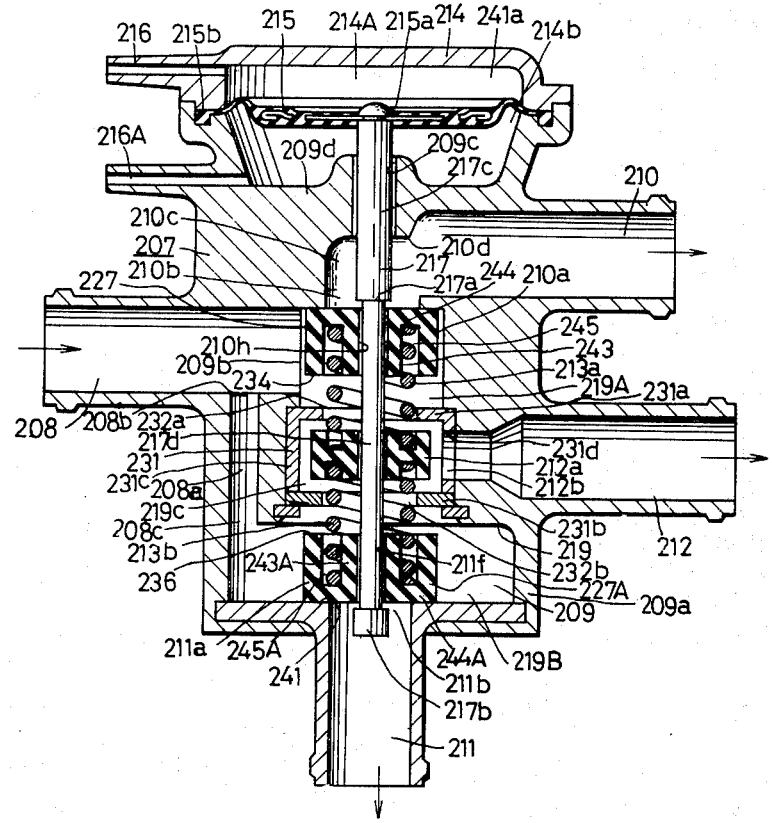
FIG. 4 is a longitudinal sectional view of still another form of the valve according to this invention.
Figure 4A:
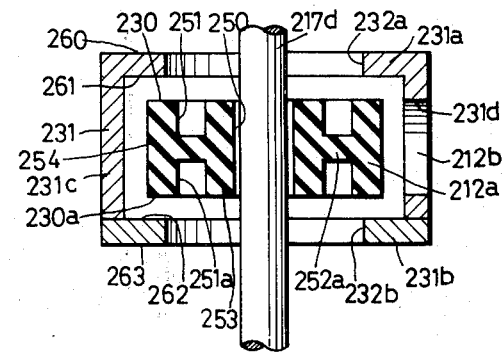
FIG. 4A is a fragmentary enlarged view of the valve shown in FIG. 4.

Description will now be given of an air flow direction control valve 207 according to still another embodiment of this invention with reference to FIG. 4 of the drawings. The valve 207 comprises a generally cylindrical valve housing 209a defining a valve chamber 209 therein. The valve housing 209a has an inner wall 219 having a generally T-shaped configuration in longitudinal section. The inner wall 219 thus defines the valve chamber 209 as having a generally T-shaped longitudinal section. The valve housing 209a is formed with four openings 209b, 210b, 211b and 212b in the inner wall 219 thereof. The first opening 209b defines an inlet port 208 provided on one side of the valve housing 209a and communicating with an air pump which is not shown, but is equivalent to what is shown at 5 in FIG. 1. The second opening 210b is formed at right angles to the first opening 209b and defines an interconnecting chamber 210c in the inner wall 219. The interconnecting chamber 210c has an outlet 210d positioned substantially at right angles to the second opening 210b and defining a first outlet port 210. The first outlet port 210 extends in parallel to the inlet port 208 but in the opposite direction thereto, and communicates with an air injection manifold not shown but equivalent to what is shown at 20 in FIG. 1. The second opening 210b is coaxial with the valve chamber 209. The third opening 211b is located coaxially with the second opening 210b at the opposite end of the valve chamber 209 from the second opening 210b and defines a second outlet port 211 extending coaxially with the valve chamber 209. The second outlet port 211 communicates with an air injection pipe which is not shown, but is equivalent to what is illustrated at 23 in FIG. 1. The fourth opening 212b is positioned between the first and third openings 209b and 211b on the opposite side of the valve chamber 209 from the first opening 209b and defines a third outlet port 212 extending in parallel to the first outlet port 210 in the same direction. The third outlet port 212 is a relief outlet and communicates with an air cleaner which is not shown, but is equivalent to what is illustrated at 6 in FIG. 1. It will be seen that the second outlet port 211 extends at right angles to the inlet port 208 and the first and third outlet ports 210 and 212 which extend in either direction in a mutually staggered relationship.

The valve 207 includes an auxiliary valve housing 231 secured to the inner wall 219 of the valve housing 209a and located in the center of the valve chamber 209 in a position between the first and third openings 209b and 211b. The auxiliary valve housing 231 is cylindrical in construction and comprises a pair of end walls 231a and 231b extending across the valve chamber 209 and a cylindrical side wall 231c extending coaxially with the valve chamber 209 and partially embedded in the inner wall 219 of the valve housing 209a. Each of the end walls 231a and 231b is formed at its center with a circular end opening as indicated at 232a and 232b, respectively, and the two end openings 232a and 232b have the same diameter. The cylindrical side wall 231c is formed with a circular side opening 231d located in a position diametrically opposite to the first opening 209b in a mutually staggered relation with respect to the longitudinal axis of the valve chamber 209. The side opening 231d of the auxiliary valve housing 231 coincides with the fourth opening 212b of the valve housing 209a. The auxiliary valve housing 231 divides the valve chamber 209 into three valve chamber sections 219A, 219B and 219C positioned one behind another along the longitudinal axis of the valve chamber 209. The first valve chamber section 219A is located immediately adjacent to the first and second openings 209b and 210b of the valve housing 209a and is coaxial with the second opening 210b. The second valve chamber section 219B is located on the opposite side of the auxiliary valve housing 231 from the first valve chamber section 219A and is immediately adjacent to the third opening 211b of the valve housing 209a. The second valve chamber section 219B is considerably larger in diameter than the first valve chamber section 219A because of the T-shaped construction of the valve chamber 209. The third valve chamber section 219C is defined by and within the auxiliary valve housing 231 and is equal in diameter to the first valve chamber section 219A.

The valve housing 209a is formed with a transversely extending end wall portion 209d extending over the second opening 210b and the first outlet port 210. The transversely extending end wall portion 209d is formed therethrough with a cylindrical hole 209c which is coaxial with the valve chamber 209 and has an inner end which is open into the interconnecting chamber 210c. An elongate valve member operating shaft 217 is slidably received in the cylindrical hole 209c and extends through the valve chamber 209 coaxially therewith. A first annular shoulder 217a is formed on the shaft 217 and is located within the interconnecting chamber 210c adjacent to the second opening 210b of the valve housing 209a when the shaft 217 is in its neutral position as illustrated in FIG. 4. The first shoulder 217a divides the shaft 217 into two halves, i.e., one end portion 217c and the other end portion 217d which is somewhat smaller in diameter than the one end portion 217c. The one end portion 217c is slidably received in the cylindrical hole 209c of the valve housing 209a and has a free extremity extending outwardly therefrom. The other end portion 217d extends through the first, then third and then second valve chamber sections 219A, 219C and 219B coaxially therewith. The shaft 217 is somewhat enlarged in diameter again adjacent to the free extremity of the other end portion 217d to define a second shoulder 217e thereon. When the shaft 217 is in its neutral position as illustrated in FIG. 4, its second shoulder 217e is located somewhat outwardly of the inner wall 219 of the valve housing 209a.

The valve housing 209a is also formed with an air bypath 208a in that portion of the inner wall 219 which is diametrically opposite to the fourth opening 212b.

The air bypath 208a is spaced outwardly from the cylindrical side wall 231c of the auxiliary valve housing 231 and extends in parallel to the shaft 217. The bypath 208a has an inlet 208b which is open into the inlet port 208 upstream of the first valve chamber section 219A, and an outlet 208c which is open into the second valve chamber section 219B.

A generally cylindrical diaphragm housing 214 is secured to the transversely extending end wall portion 209d of the valve housing 209a and defines a substantially cylindrical diaphragm chamber 214A therein. A circular diaphragm 215 is provided in the diaphragm chamber 214A coaxially therewith and divides the diaphragm chamber 214A into two coaxial sections, i.e., a first section 214a and a second section 214b which is located closer to the valve housing 209a then the first section 214a. The diaphragm 215 is secured at its center 215a to the free extremity of the one end portion 217c of the shaft 217 and has a peripheral edge 215b locked between the adjoining wall edges of the valve housing 209a and the diaphragm housing 214. An elongate first sensing port 216 extends through the wall of the diaphragm housing 214 at right angles to the longitudinal axis of the diaphragm chamber 214A and is open at one end into the first diaphragm chamber section 214a. A similar elongate second sensing port 216A extends through the valve housing end wall portion 209d in parallel to the first sensing port 216 and is open at one end into the second diaphragm chamber section 214b. The other ends of the two sensing ports 216 and 216A communicate with an appropriate source of control air not shown, whereby the pressure of the air in the first and second diaphragm chamber sections 214a and 214b may be selectively varied relative to each other to thereby allow axial back and forth movement of the shaft 217 through the valve chamber 209.

One end wall 231a of the auxiliary valve housing 231 has an annular outer surface 260 facing the first valve chamber section 219A and an annular inner surface 261 facing the third valve chamber section 219C. The other end wall 231b has an annular inner surface 262 facing the third valve chamber section 219C and an annular outer surface 263 facing the second valve chamber section 219B.

A first valve member 210a is provided in the first valve chamber section 219A coaxially with the second opening 210b of the valve housing 209a and encircles the other end portion 217d in a position adjacent to the first shoulder 217a of the shaft 217. The first valve member 210a comprises a cylindrical inner wall 243 and a cylindrical outer wall 227 having the same length as the inner wall 243 and connected with the inner wall 243 by an integral flat end wall 244. The inner wall 243 defines therethrough an axial bore 210h through which the other shaft end portion 217d slidably extends. The inner and outer walls 243 and 227 define an annular groove 245 therebetween which is open toward the auxiliary valve housing 231. The outer wall 227 has an outer diameter which is slightly smaller than the diameter of the first valve chamber section 219A, and a length which is considerably smaller than the diameter of the first opening 209b. The end wall 244 faces the second opening 210b of the valve housing 209a and is considerably larger in diameter than the second opening 210b. When the shaft 217 is in its neutral position as shown in FIG. 4, the first shoulder 217a is spaced apart from the end wall 244 of the first valve member 210a and the end wall 244 is maintained in sealing contact with the peripheral edge of the second opening 210b. The axial bore 210h has a diameter which is slightly larger than the diameter of the other shaft end portion 217d, but smaller than the first shoulder 217a.

A second valve member 211a is provided in the second valve chamber section 219B coaxially with the third opening 211b of the valve housing 209a and encircles the other shaft end portion 217d in a position adjacent to the second shoulder 217e of the shaft 217. The second valve member 211a is identical in construction to the first valve member 210a and is placed symmetrically to the first valve member 210a with respect to a line passing through the fourth opening 212b and extending across the auxiliary valve housing 231. The second valve member 211a comprises a cylindrical inner wall 243A, a cylindrical outer wall 227A and an annular flat end wall 244A connecting the inner and outer walls 243A and 227A integrally. The second valve member 211a has an axial bore 211f through which the other shaft end portion 217d slidably extends. The second valve member 211a has an overall diameter which is considerably larger than the diameter of the third opening 211b, and a length which is considerably smaller than the length of the second valve chamber section 219B. An annular groove 245A is defined by and between the inner and outer walls 243A and 227A and is open toward the auxiliary valve housing 231. When the shaft 217 is in its neutral position, the second shoulder 217e of the shaft 217 is spaced apart from the end wall 244A into the second outlet port 211 and the end wall 244A is maintained in sealing contact with the peripheral edge 241 of the third opening 211b. The axial bore 211f is slightly larger in diameter than the other shaft end portion 217d, but smaller than the second shoulder 217e.

A third valve member 212a is provided in the third valve chamber section 219C coaxially with the end openings 232a and 232b of the auxiliary valve housing 231 and encircles the other shaft end portion 217d in a position intermediate the opposite ends thereof. The third valve member 212a comprises a cylindrical inner wall 253, a cylindrical outer wall 254 having the same length as the inner wall 253 and a central wall 252a extending between the inner and outer walls 253 and 254 and connecting them integrally. The inner wall 253 has an inner diameter which is slightly larger than the diameter of the other shaft end portion 217d and defines an axial bore 250 through which the other shaft end portion 217d slidably extends. The central wall 252a defines between the inner and outer walls 253 and 254 a pair of annular grooves 251 and 251a each located on one side of the third valve member 212a. The inner wall 253 of the third valve member 212a has an outer diameter which is equal to those of the inner walls 243 and 243A of the first and second valve members 210a and 211a, respectively. Accordingly, one annular groove 251 of the third valve member 212a is axially aligned with the annular groove 245 of the first valve member 210a and disposed face to face therewith. The other annular groove 251a of the third valve member 212a is axially aligned with the annular groove 245A of the second valve member 211a face to face therewith. The outer wall 254 of the third valve member 212a has an outer diameter which is smaller than the inner diameter of the side wall 231c of the auxiliary valve housing 231, but larger than the diameter of the end openings 232a and 232b of the auxiliary valve housing 231. The third valve member 212a has an overall length which is considerably smaller than the inner axial length of the auxiliary valve housing 231. When the shaft 217 is in its neutral position as illustrated in FIG. 4, the third valve member 212a is positioned in the middle of the auxiliary valve housing 231 and the outer wall 254 thereof has one end 230 spaced apart from the inner surface 261 of one end wall 231a of the auxiliary valve housing 231, while the other end 230a of the outer wall 254 is spaced apart from the inner surface 262 of the other end wall 231b of the auxiliary valve housing 231, whereby both of the end openings 232a and 232b of the auxiliary valve housing 231 are kept open in the neutral position of the shaft 217.

A first coil spring 213a is secured at one end in the groove 245 of the first valve member 210a and extends through the end opening 232a into the auxiliary valve housing 231, while the other end of the first coil spring 213a is held in one groove 251 of the third valve member 212a. A second coil spring 213b, which is identical in construction to the first valve member 213a, is secured at one end in the groove 245A of the second valve member 211a and extends through the other end opening 232b into the auxiliary valve housing 231. The other end of the second coil spring 213b is held in the other groove 251a of the third valve member 212a. The first and second coil springs 213a and 213b act against the third valve member 212a with the same force in the opposite directions, so that the third valve member 212a is maintained in its neutral position as illustrated in FIG. 4, while the first and second valve members 210a and 211a keep closed the second and third openings 210b and 211b, respectively, when the shaft 217 is in its neutral position. It will, thus, be noted that when the shaft 217 is in its neutral position, all of the air delivered into the valve chamber 209 directly and through the bypath 208a flows out into the third outlet port 212 which is normally open, without flowing into either the first or second outlet port 210 or 211. It will also be observed that the flow of air through the third outlet port 212 may be maintained through the auxiliary valve chamber 231 having an always open side opening 231d, whenever at least one of the two end openings 232a and 232b of the auxiliary valve housing 231 is open. The flow of air through the third outlet port 212 is maintained throughout any period during which the shaft 217 is in its neutral position as illustrated in FIG. 4.

In order to distribute air through the first outlet port 210, the pressure of the control air in the second diaphragm chamber section 214b is reduced relative to the first section 214a. The diaphragm 215 causes the shaft 217 to move inwardly and the first shoulder 217a of the shaft 217 abuts against the end wall 244 of the first valve member 210a. The first shoulder 217a pushes the first valve member 210a inwardly against the action of the first coil spring 213a to open a clearance between the end wall 244 of the first valve member 210a and the peripheral edge of the second opening 210b. Thus, a flow of air is established between the inlet port 208 and the first outlet port 210 through the first valve chamber section 219A. The inner end 234 of the outer wall 227 of the first valve member 210a abuts against the outer surface 260 of the auxiliary valve housing 231 and closes the end opening 232a thereof. The action of the first coil spring 213a causes the third valve member 212a to move axially in the same direction as the shaft 217 by overcoming the action of the second coil spring 213b. The opposite end 230a of the outer wall 254 of the third valve member 212a abuts against the inner surface 262 of the other end wall 231b of the auxiliary valve housing 231 and closes the other end opening 232b of the auxiliary valve housing 231. Accordingly, the first end opening 232a of the auxiliary valve housing 231 is closed by the first valve member 210a and the second end opening 232b by the third valve member 212a, so that air ceases to flow into the third outlet port 212. The second valve member 211a keeps the second outlet port 211 closed by the action of the second coil spring 213b.

In order to supply air through the second outlet port 211, the operation as hereinabove described may be reversed. The pressure of the control air in the first diaphragm chamber section 214a is reduced relative to the second section 214b. The diaphragm 215 causes the shaft 217 to move outwardly into the diaphragm chamber 214A and the second shoulder 217e of the shaft 217 abuts against the end wall 244A of the second valve member 211a. The second shoulder 217e pushes the second valve member 211a inwardly against the action of the second coil spring 213b, whereby a clearance is created between the end wall 244A of the second valve member 211a and the peripheral edge 241 of the third opening 211b to establish communication between the inlet port 208 and the second outlet port 211 through the bypath 208a and the second valve chamber section 219B. The second valve member 211a closes the adjacent end opening 232b of the auxiliary valve housing 231 and the third valve member 212a closes the oppositely disposed end opening 232a thereof, while the first valve member 210a keeps the first outlet port 210 closed.

It will be understood in a pattern similar to what has already been described in connection with the embodiments of FIGS. 2 and 3 that the flow of air through the third outlet port 212 may coexist with the flow of air through either the first or second outlet port 210 or 211 in the event the pressure of the air introduced into the valve chamber 209 is built up and exceeds a predetermined upper limit which is high enough to overcome the action of the first or second coil spring 213a or 213b. When air is flowing through the first valve chamber section 219A into the first outlet port 210, air also flows into the second valve chamber section 219B through the bypath 208a. The air thus introduced into the second valve chamber section 219B builds up a pressure which is high enough to force open the adjacent end opening 232b of the auxiliary valve housing 231, so that any excess air delivered into the second valve chamber section 219B is bypassed through the third outlet port 212. Likewise, when air is flowing into the second outlet port 211 through the bypath 208a and the second valve chamber section 219B, air also flows into the first valve chamber section 219A which is closed by the first valve member 210a at one end and by the third valve member 212a at the other end. The air flowing into the first valve chamber section 219A builds up a pressure which is high enough to force the third valve member 212a to retract from the adjacent end opening 232a of the auxiliary valve housing 231, whereby any excess air flowing into the first valve chamber section 219A is bypassed through the third outlet port 212.

It will be observed in connection with any of the embodiments hereinabove described that any unnecessary or excess air bypassed through the third outlet port is not discharged into the atmosphere, but is returned into the air cleaner to avoid any unpleasant noise that may otherwise be caused.

While the invention has been described with reference to a number of preferred embodiments thereof, it will be understood that further modifications or variations may be easily made by anyone of ordinary skill in the art without departing from the scope of the invention which is defined by the appended claims.

What is claimed is:

1. An air flow control valve comprising:
   a housing having defined therein:
      an inlet opening,
      a first outlet opening,
      a second outlet opening, and
      a third outlet opening;
   a shaft axially movable between a first position and a second position and from a neutral position thereof; said shaft having a pair of spaced mutually facing shoulders thereon;
   a first valve member coaxial with and encircling said shaft, said first valve member being spaced from one of said shoulders and closing said first outlet opening when the shaft is in said neutral position and being engagable and moved in one direction by said one shoulder when said shaft is moved into said first position to open said first outlet opening;
   a second valve member coaxial with and encircling said shaft, said second valve member being spaced from the other one of said shoulders and closing said second outlet opening when the shaft is in said neutral position and being engagable and moved in a direction opposite to said one direction by said other shoulder when said shaft is moved into said second position to open said second outlet opening;
   a third valve member disposed coaxially with respect to said first valve member and said second valve member, said third valve member fluidly communicating said inlet opening and said third outlet opening when said first outlet opening and said second outlet opening are closed respectively by said first valve member and said second valve member;
   first resilient means, connected at one end to said first valve member and connected at the other end to said second valve member, for biasing said first and second valve members toward said first and second outlet openings respectively for closing thereof; and
   second resilient means connected to said third valve member for biasing same.

2. An air flow control valve as claimed in claim 1, wherein:
   said second valve member is between said first valve member and said third valve member;
   said housing has an inwardly projecting cylindrical extension in which said second outlet opening is defined;
   said third valve member encircles said extension and is slidable therealong;
   said first resilient means comprises a first compression spring extending between said first valve member and said second valve member and disposed coaxially about said shaft; and
   said second resilient means comprises a second compression spring encircling said extension, one end of said second spring being connected to said third valve member and the other end thereof being connected to said housing.

3. An air flow control valve as claimed in claim 1, wherein:
said housing comprises an outer housing and an inner housing within said outer housing,
said third valve member being in said inner housing,
said inner housing having defined therein:
a pair of openings on opposite sides thereof coaxial with respect to said third valve member, and
said third outlet opening, said third outlet opening being disposed at right angles to said pair of openings;
said pair of openings being alternatively closable by said third valve member upon movement of said shaft into said first and second positions respectively to thereby block fluid communication between said inlet opening and said third outlet opening;
said first resilient means comprises
a first portion of a first compression spring connected to said first valve member, and
a first portion of a second compression spring connected to said second valve member; and
said second resilient means comprises:
a second portion of said first compression spring for biasing said third valve member away from one of said pair of openings when said shaft is in said neutral position, and
a second portion of said second compression spring for biasing said third valve member away from the other one of said pair of openings when said shaft is in said neutral position.

4. An air flow control valve comprising:
a valve housing having defined therein:
an inlet opening,
a first outlet opening,
a second outlet opening, and
a third outlet opening
a shaft axially movable from a neutral position and between a first position and a second position, said shaft having a pair of spaced mutually facing shoulders thereon;
a first valve member coaxial with and encircling said shaft, said first valve member being spaced from one of the shoulders and closing said first outlet opening when the shaft is in said neutral position and being engagable and moved in one direction by said one shoulder when said shaft is moved into said first position to open said first outlet opening;
a second valve member coaxial with and encircling said shaft, said second valve member being spaced from the other one of said shoulders and closing said second outlet opening when the shaft is in said neutral position and being engagable and moved in a direction opposite to said one direction by said other shoulder when said shaft is moved into said second position to open said second outlet opening;
a third valve member disposed coaxially with respect to said first valve member and said second valve member, said third valve member fluidly communicating said inlet opening and said third outlet opening when said first outlet opening and said second outlet opening are closed respectively by said first valve member and said second valve member;
said second valve member being between said first valve member and said third valve member;
a first means, connected at one end to said first valve member and connected at the other end to said second valve member, for biasing said first and second valve members towards said first and second outlet openings respectively for closing thereof; and
second means, connected at one end to said third valve member, for biasing said third valve member toward said first and second valve members.

5. An air flow control valve as claimed in claim 4, wherein:
said housing has an inwardly projecting cylindrical extension, the inner end of which defines said second outlet opening, said extension being coaxial with said shaft;
said third valve member encircles said extension and is slidable therealong;
said first means comprises a coil spring disposed coaxially about said shaft and extending between said first valve member and said second valve member; and
said second means comprises a second coil spring encircling said extension, the other end of said second spring being connected to said housing.

6. An air flow control valve as claimed in claim 4, wherein:
each of said first valve member, said second valve member, and said third valve member is substantially cylindrical.

7. An air flow control valve comprising:
a valve housing having defined therein:
an inlet opening,
a first outlet opening,
a second outlet opening, and
a third outlet opening;
a shaft axially movable from a neutral position and between a first position and a second position, said shaft having a pair of spaced mutually facing shoulders thereon;
a first valve member comprising:
an inner cylindrical wall coaxial with and encircling said shaft,
an apertured outer cylindrical wall having an axial length greater than that of the inner cylindrical wall, and
an end wall connecting said inner cylindrical wall and said outer cylindrical wall, said end wall being spaced from one of said shoulders and closing said first outlet opening when the shaft is in said neutral position and being engagable and moved in one direction by said one shoulder when said shaft is moved into said first position to open said first outlet opening,
a second substantially cylindrical valve member coaxial with and encircling said shaft, said second valve member being spaced from the other one of said shoulders and closing said second outlet opening when the shaft is in said neutral position and being engagable and moved in a direction opposite to said one direction by said other shoulder when said shaft is moved into said second position to open said second outlet opening;
a third substantially cylindrical valve member disposed coaxially with respect to said first valve member and said second valve member;
said second valve member being between said first valve member and said third valve member;

a stationary annular seal sealingly secured in the valve housing and encircling in an air-tight manner the outer cylindrical wall of the first valve member adjacent the end thereof more remote from the end wall;

said third valve member having an end surface having a diameter greater than the inner diameter of the annular seal and being in abutment therewith to block fluid communication between the inlet opening and the third outlet opening when said shaft is in said second position, said third valve member also being engaged and moved away from said annular seal by said second valve member when said shaft is in said neutral position to fluidly communicate said inlet opening and said third outlet opening and being in abutment with and moved away from said annular seal by the end of the outer cylindrical wall of the first valve member more remote from the end wall when said shaft is in said first position with that end and the end surface of the third valve member blocking fluid communication between the inlet opening and the third outlet opening;

a first spring, one end of which is connected to the first valve member and the other end of which is connected to the second valve member, for biasing said first and second valve members toward said first and second outlet openings respectively; and a second spring, one end of which is connected to said third valve member, for biasing said third valve member toward said annular seal, said first valve member, and said second valve member.

8. An air flow control valve as claimed in claim 7, wherein:

the axial length of the outer cylindrical wall of the first valve member is greater than the combined axial length of the inner cylindrical wall of the first valve member and the second valve member.

9. An air flow control valve as claimed in claim 7, wherein:

said housing has an inwardly projecting cylindrical extension, the inner end of which defines said second outlet opening, said extension being coaxial with said shaft; and said third valve member encircles said extension and is slidable therealong.

10. An air flow control valve as claimed in claim 9, wherein:

said second valve member comprises
a first inner shoulder in one end portion thereof and a second inner shoulder in the other end portion thereof, each of said first and second shoulders facing said second opening,
an outer shoulder adjacent said second inner shoulder, and
an extremity encircling the inner end of said extension, said extremity extending axially from said second inner shoulder and said outer shoulder in a direction toward said third valve member;

said second inner shoulder and said extremity being engagable with said inner end of said extension and said end surface of said third valve member respectively upon movement of said shaft into said first position;

said other shoulder of said shaft faces said first inner shoulder of said second valve member and is engaged and moved thereby upon movement of said shaft into said second position; and the other end of said first spring being connected to said outer shoulder.

11. An air flow control valve as claimed in claim 7, further comprising:

a diaphragm housing secured to said valve housing and defining therein a diaphragm chamber;

a diaphragm in said diaphragm chamber and dividing said diaphragm chamber into a first and a second diaphragm chamber section;

one end of said shaft being secured to said diaphragm, a first control air port which opens at one end into said first diaphragm chamber section;

a second control air port which opens at one end into said second diaphragm chamber section;

the other ends of each of said ports being in fluid communication with a source of air whereby the pressure in said first diaphragm chamber section and in said second diaphragm chamber section can be controlled to move said diaphragm in a given direction to move said shaft into said first position and in a direction opposite to said given direction to move said shaft into said second position.

12. An air flow control valve as claimed in claim 7, wherein:

said first spring has a larger spring force than said second spring.

13. An air flow control valve as claimed in claim 7, wherein:

said outer cylindrical wall of said first valve member encircles said second valve member, said inner and outer cylindrical walls of said first valve member define an annular groove therebetween in which said one end of said first spring is engaged, and said outer wall has a plurality of holes defined therethrough.

14. An air flow control valve as claimed in claim 7, further comprising:

a support ring secured to an inner wall of the valve housing for supporting the annular seal, said ring being in abutment with and having an inner diameter greater than that of the annular seal.

15. An air flow control valve comprising:
a housing having defined therein:
an inlet opening,
a first outlet opening,
a second outlet opening, and
a third outlet opening;

a shaft axially movable and from a neutral position between a first position and a second position, said shaft having a pair of spaced mutually facing shoulders thereon;

a first valve member coaxial with and encircling said shaft, said first valve member being spaced from one of said shoulders and closing said first outlet opening when the shaft is in said neutral position and being engagable and moved in one direction by said one shoulder when said shaft is moved into said first position to open said first outlet opening;

a second valve member coaxial with and encircling said shaft, said second valve member being spaced from the other one of said shoulders and closing said second outlet opening when the shaft is in said neutral position and being engagable and moved in a direction opposite to said one direction by said other shoulder when said shaft is moved into said second position to open said second outlet opening;

a third valve member disposed coaxially with respect to said first valve member and said second valve member, said third valve member fluidly communicating said inlet opening and said third outlet opening when said first outlet opening and said second outlet opening are closed respectively by said first valve member and said second valve member;

said third valve member being between said first valve member and said second valve member;

first means, connected at one end to said first valve member and connected at the other end to said third valve member, for biasing said first valve member toward said first outlet opening for closing thereof; and second means, connected at one end to said second valve member and connected at the other end to said second valve member, for biasing said second valve member toward said second outlet opening for closing thereof.

16. An air flow valve as claimed in claim 15, wherein:

said valve housing comprises an outer housing and an inner housing within said outer housing;

said third valve member being in said inner housing;

said inner housing having defined therein:
a pair of openings on opposite sides thereof coaxial with respect to said third valve member, and
said third outlet opening, said third outlet opening being disposed at right angles to said pair of openings;

one of said pair of openings being closable by said third valve member and the other of said pair of openings being closable by said second valve member upon movement of said shaft into said second position and the other of said pair of openings being closable by said third valve member and said one of said pair of openings being closable by said first valve member upon movement of said shaft into said first position to thereby block fluid communication between said inlet opening and said third outlet opening;

said first means comprises a first compression spring also for biasing said third valve member away from said one of said pair of openings when said shaft is in said neutral position; and said second means comprises a second compression spring also for biasing said third valve member away from the other of said pair of openings when said shaft is in said neutral position.

17. An air flow control valve as claimed in claim 15, wherein:

each of said first valve member, said second valve member, and said third valve member is substantially cylindrical.

18. An air flow control valve comprising:

a shaft axially movable from a neutral position and between a first and a second position, said shaft having a pair of mutually facing shoulders thereon;

a valve housing defining a valve chamber therein, said housing comprising an outer housing and an inner housing therein, said inner housing dividing said valve chamber into first, second, and third valve chamber sections, said third chamber section being within said inner housing and between said first and second chamber sections;

said housing having defined therein:
an inlet opening in fluid communication with said first and second valve chamber sections,
a first outlet opening in said first chamber section,
a second outlet opening in said second chamber section, and
a third outlet opening in said third chamber section;

said inner housing having defined therein a pair of openings on opposite sides thereof coaxial with respect to said shaft, one of said pair of openings fluidly communicating said first and third valve chamber sections and the other of said pair of openings fluidly communicating said second and third valve chamber sections;

a first valve member, in said first valve chamber section, coaxial with and encircling said shaft, said first valve member being spaced from one of said shoulders and closing said first outlet opening when the shaft is in said neutral position and being engagable and moved in one direction by said one shoulder when said shaft is moved into said first position to open said first outlet opening and close said one of said pair of openings, a second valve member, in said second valve chamber section, coaxial with and encircling said shaft, said second valve member being spaced from the other one of said shoulders and closing said second outlet opening when the shaft is in said neutral position and being engaged and moved in a direction opposite to said one direction by said other shoulder when said shaft is moved into said second position to open said second outlet opening and close the other of said pair of openings;

a third valve member, in said third valve chamber section, coaxial with and encircling said shaft, said other of said pair of openings being closed by said third valve member upon movement of said shaft into said first position and said one of said pair of openings being closed by said third valve member upon movement of said shaft into said second position to thereby block fluid communication between the inlet opening and said third outlet opening;

a first spring, connected at one end to said first valve member and connected at the other end to said third valve member, for biasing said first valve member toward said first outlet opening for closing thereof and for biasing said third valve member away from said one of said pair of openings when said shaft is in said neutral position; and a second spring, connected at one end to said second valve member and connected at the other one to said third valve member, for biasing said second valve member toward said second outlet opening for closing thereof and for biasing said third valve member away from the other one of said pair of openings when said shaft is in said neutral position.

19. An air flow control valve as claimed in claim 18, wherein:

each of said first valve member, said second valve member, and said third valve member is substantially cylindrical.

20. An air flow control valve as claimed in claim 18, wherein:

said inlet opening is in said first valve chamber section; and a bypath passage is defined in said outer valve housing to fluidly communicate said inlet opening with said second valve chamber section.

21. An air flow control valve as claimed in claim 18, further comprising:

a diaphragm housing secured to said valve housing and defining therein a diaphragm chamber;
a diaphragm in said diaphragm chamber and dividing said diaphragm chamber into a first and a second diaphragm chamber section;
one end of said shaft being secured to said diaphragm,
a first control air port which opens at one end into said first diaphragm chamber section;
a second control air port which opens at one end into said second diaphragm chamber section;
the other ends of each of said ports being in fluid communication with a source of air whereby the pressure in said first diaphragm chamber section and in said second diaphragm chamber section can be controlled to move said diaphragm in a given direction to move said shaft into said first position and in a direction opposite to said given direction to move said shaft into said second position.

22. An air flow control valve as claimed in claim 18, wherein:
the shoulders on the shaft are intermediate the ends thereof;
said shaft is circular in transverse cross-section and the diameter thereof between the shoulders thereon is less than that at each end of the shaft; and
the third valve member encircles a portion of the shaft between the shoulders thereon.

23. An air flow control valve as claimed in claim 18, wherein:
said inner housing comprises:
a cylindrical side wall secured to an inner wall of said outer housing, and
a pair of spaced annular end walls, said one of said pair of openings being defined in one of said pair of end walls and said other of said pair of openings being defined in the other of said pair of end walls;
said third outlet opening being defined in said cylindrical side wall;
each of said pair of openings being circular;
said first valve member being substantially cylindrical and having a length less than the distance between said first outlet opening and said one of said pair of end walls;
said second valve member being substantially cylindrical and having a length less than the distance between said second outlet opening and said other of said pair of end walls; and
said third valve member being substantially cylindrical having an outer diameter greater than that of each of said pair of openings and less than that of the cylindrical side wall of the inner housing, and having a length less than the distance between said pair of end walls of said inner housing.

24. An air flow valve as claimed in claim 23, wherein:
each of said first, second and third outlet openings being circular;
said first valve member comprises:
a first cylindrical inner wall,
a first cylindrical outer wall spaced from said cylindrical inner wall, and
an annular end wall connecting said first cylindrical outer wall to said first cylindrical inner wall at one end thereof, facing said first outlet opening, and having an outer diameter greater than that of said first outlet opening;
said first cylindrical outer wall and said first cylindrical inner wall defining an annular groove therebetween which faces said one of said pair of openings;
the other end of said first cylindrical outer wall being engagable with said one of said pair of end walls to close said opening therein upon movement of said shaft into said first position thereof;
said second valve member comprises:
a second cylindrical inner wall,
a second cylindrical outer wall spaced from said cylindrical inner wall, and
an annular end wall connecting said second cylindrical outer wall to said second cylindrical inner wall at one end thereof, facing said second outlet opening, and having an outer diameter greater than that of said second outlet opening,
said second cylindrical outer wall and said second cylindrical inner wall defining an annular groove therebetween which faces the other of said pair of openings,
the other end of said second cylindrical outer wall being engagable with the other of said pair of end walls to close the opening therein upon movement of said shaft into said second position thereof;
said third valve member comprises:
a third cylindrical inner wall,
a third cylindrical outer wall spaced from said third cylindrical inner wall, and
an annular central wall connecting said third inner wall and said third outer wall intermediate the ends thereof;
said central wall and said third inner and outer walls defining a pair of oppositely facing annular grooves therebetween, one of said pair of annular grooves facing and being axially aligned with the annular groove in the first valve member, the other of said pair of annular grooves facing and being axially aligned with the annular groove in the second valve member;
one end of said third outer wall being engagable with said one of said pair of end walls of said inner housing to close the opening therein upon movement of said shaft into said second position, and the other end of said third outer wall being engagable with the other of said pair of end walls of said inner housing to close the opening therein upon movement of said shaft into said first position.

25. An air flow control valve as claimed in claim 24, wherein:
said first spring extends through said one of said pair of openings, said one end of said first spring being engaged in the annular groove in the first valve member and said other end of said first spring being engaged in said one of said pair of annular grooves in said third valve member;
said second spring extends through said other of said pair of openings, said one end of said second spring being engaged in the annular groove in the second valve member and said other end of said second spring being engaged in said other of said pair of annular grooves in said third valve member;
said first spring comprises a first coil spring;
said second spring comprises a second coil spring; and
said first coil spring has a spring force substantially equal to that of said second coil spring.

* * * * *